United States Patent
Yamanobe et al.

(10) Patent No.: US 9,773,352 B2
(45) Date of Patent: Sep. 26, 2017

(54) WORK MACHINE AND WORK MACHINE MANAGEMENT SYSTEM

(71) Applicant: Komatsu Ltd., Tokyo (JP)

(72) Inventors: Hiroo Yamanobe, Fujisawa (JP); Shigeyuki Tada, Hiratsuka (JP); Junya Morita, Fujisawa (JP); Shinya Komori, Fujisawa (JP)

(73) Assignee: Komatsu Ltd., Tokyo (JP)

( * ) Notice: Subject to any disclaimer, the term of this patent is extended or adjusted under 35 U.S.C. 154(b) by 84 days.

(21) Appl. No.: 14/350,895

(22) PCT Filed: Nov. 19, 2013

(86) PCT No.: PCT/JP2013/081216
§ 371 (c)(1),
(2) Date: Apr. 10, 2014

(87) PCT Pub. No.: WO2015/029268
PCT Pub. Date: Mar. 5, 2015

(65) Prior Publication Data
US 2015/0279123 A1  Oct. 1, 2015

(51) Int. Cl.
*B60Q 1/00* (2006.01)
*G07C 3/00* (2006.01)
(Continued)

(52) U.S. Cl.
CPC ............. *G07C 3/00* (2013.01); *E02F 9/26* (2013.01); *H04L 67/125* (2013.01); *H04L 67/12* (2013.01)

(58) Field of Classification Search
CPC ............. G07C 3/00; E02F 9/26; H04L 67/125
See application file for complete search history.

(56) References Cited

U.S. PATENT DOCUMENTS 6,204,772 B1 * 3/2001 DeMay ............... B60R 25/1012
340/426.28
6,618,396 B1 * 9/2003 Kondo ............. H04L 12/40058
370/474

(Continued)

FOREIGN PATENT DOCUMENTS

CN  1409564 A   4/2003
CN  1852075 A   10/2006

(Continued)

OTHER PUBLICATIONS

International Search Report and Written Opinion dated Jan. 21, 2014, issued for PCT/JP2013/081216.

*Primary Examiner* — Joseph Feild
*Assistant Examiner* — Rufus Point
(74) *Attorney, Agent, or Firm* — Locke Lord LLP

(57) ABSTRACT

A work machine includes: an information generation unit that generates work machine information as information on the work machine; a division unit that divides the work machine information by a predetermined data amount to generate divided work machine information; an information assignment unit that assigns attribute information indicating an attribute of the divided work machine information to the divided work machine information; and a communication unit that transmits, to an outside of the work machine, the work machine information or the divided work machine information to which the attribute information is assigned.

15 Claims, 7 Drawing Sheets

(51) Int. Cl.
  *H04L 29/08* (2006.01)
  *E02F 9/26* (2006.01)

(56) References Cited

U.S. PATENT DOCUMENTS

| | | | | |
|---|---|---|---|---|
| 6,665,546 | B2* | 12/2003 | Slaughter | H01Q 1/125 |
| | | | | 370/310 |
| 6,957,349 | B1* | 10/2005 | Yasukura | H04L 9/34 |
| | | | | 380/216 |
| 7,050,408 | B2 | 5/2006 | Shen et al. | |
| 7,689,234 | B2 | 3/2010 | Horvath et al. | |
| 7,706,937 | B2 | 4/2010 | Hasegawa et al. | |
| 8,756,331 | B2* | 6/2014 | Moughler | G07C 5/00 |
| | | | | 709/231 |
| 2002/0164957 | A1* | 11/2002 | Lovberg | H01Q 1/125 |
| | | | | 455/73 |
| 2003/0058815 | A1 | 3/2003 | Shen et al. | |
| 2003/0163580 | A1 | 8/2003 | Lee | |
| 2004/0098499 | A1* | 5/2004 | Tamai | H04L 67/1008 |
| | | | | 709/232 |
| 2004/0145241 | A1* | 7/2004 | Arakawa | B60R 25/102 |
| | | | | 307/10.3 |
| 2004/0148083 | A1* | 7/2004 | Arakawa | G07C 5/008 |
| | | | | 701/50 |
| 2005/0002354 | A1* | 1/2005 | Kelly | H04L 45/04 |
| | | | | 370/329 |
| 2005/0002421 | A1* | 1/2005 | Ito | H04B 1/0483 |
| | | | | 370/474 |
| 2005/0210355 | A1* | 9/2005 | Itoh | H03M 13/29 |
| | | | | 714/748 |
| 2006/0268855 | A1* | 11/2006 | Brandt | G05B 19/042 |
| | | | | 370/389 |
| 2007/0142990 | A1* | 6/2007 | Moughler | G07C 5/00 |
| | | | | 701/50 |
| 2007/0176778 | A1* | 8/2007 | Ando | B60R 25/1004 |
| | | | | 340/572.1 |
| 2007/0254681 | A1 | 11/2007 | Horvath et al. | |
| 2008/0258892 | A1* | 10/2008 | Itoh | B60K 37/02 |
| | | | | 340/441 |
| 2008/0300020 | A1* | 12/2008 | Nishizawa | H04L 63/0853 |
| | | | | 455/558 |
| 2009/0099898 | A1* | 4/2009 | Ehrman | G06Q 10/063114 |
| | | | | 705/7.15 |
| 2009/0129393 | A1* | 5/2009 | Okuno | H04L 49/1523 |
| | | | | 370/395.6 |
| 2010/0226377 | A1 | 9/2010 | Ogasahara et al. | |
| 2010/0330930 | A1 | 12/2010 | Twitchell | |
| 2011/0321106 | A1* | 12/2011 | Takahashi | H04N 21/2383 |
| | | | | 725/109 |
| 2012/0083222 | A1* | 4/2012 | Kawashimo | H04B 5/02 |
| | | | | 455/68 |
| 2012/0092694 | A1* | 4/2012 | Tsubota | G06K 15/1821 |
| | | | | 358/1.14 |
| 2012/0327983 | A1* | 12/2012 | Nakajima | H04L 1/0003 |
| | | | | 375/219 |
| 2015/0279123 | A1* | 10/2015 | Yamanobe | G07C 3/00 |
| | | | | 340/425.5 |

FOREIGN PATENT DOCUMENTS

| | | |
|---|---|---|
| CN | 101325740 A | 12/2008 |
| CN | 101438538 A | 5/2009 |
| CN | 101438606 A | 5/2009 |
| DE | 60213180 T2 | 11/2006 |
| EP | 1959604 A1 | 8/2008 |
| JP | 2000-244557 A | 9/2000 |
| JP | 2002-516039 A | 5/2002 |
| JP | 2003-179978 A | 6/2003 |
| JP | 2006-092017 A | 4/2006 |
| JP | 2009-536408 A | 10/2009 |
| JP | 2012-052380 A | 3/2012 |
| JP | 2012-217084 A | 11/2012 |
| JP | 2013-165410 A | 8/2013 |
| KR | 10-1070956 B1 | 10/2011 |

* cited by examiner

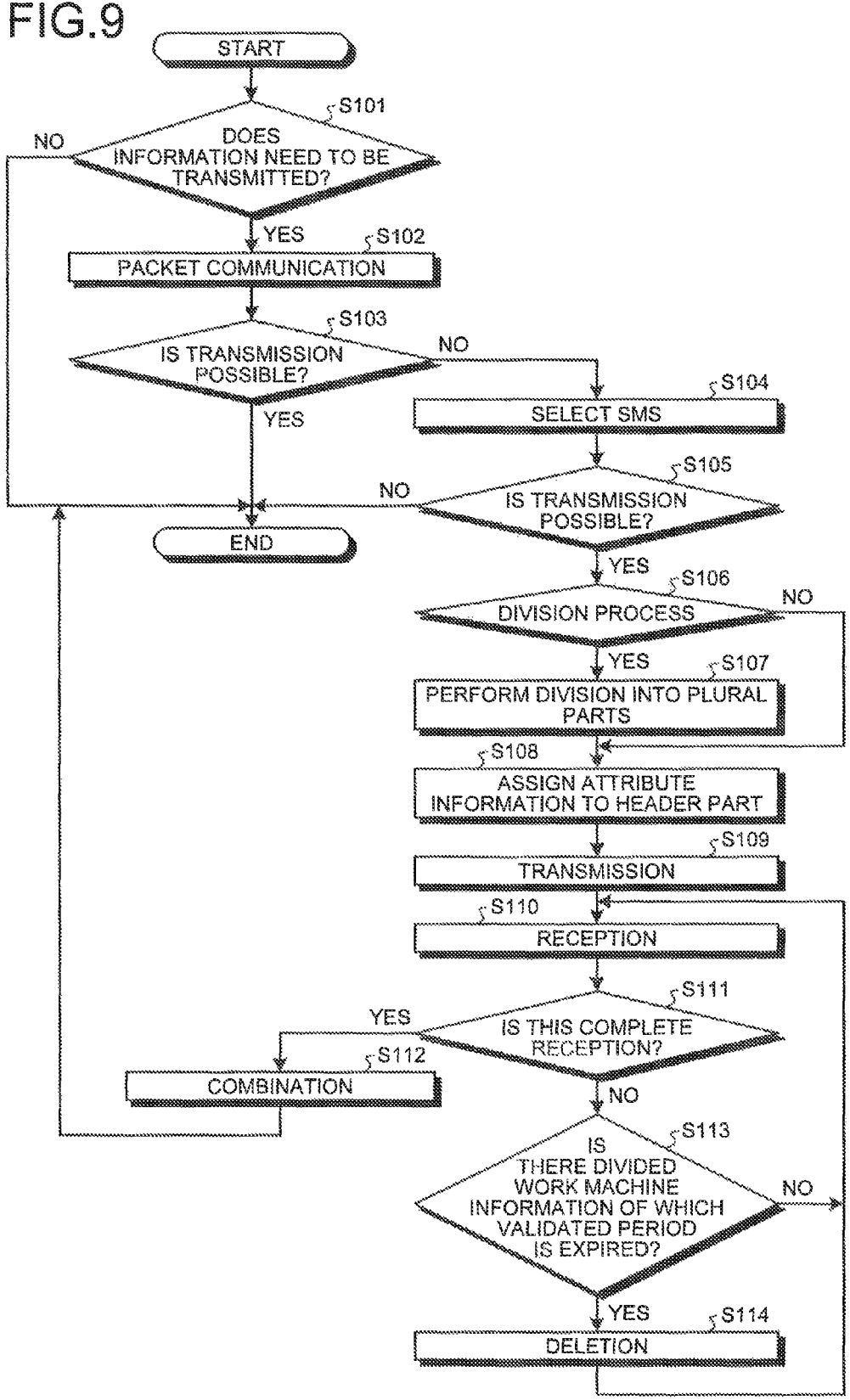

WORK MACHINE AND WORK MACHINE MANAGEMENT SYSTEM

FIELD

The present invention relates to a work machine and a work machine management system.

BACKGROUND

There is known a management system that manages a work machine such as a construction machine (for example, see Patent Literature 1). In such a work machine management system, a management device receives work machine information from a terminal installed in the work machine via a communication line in many cases.

CITATION LIST

Patent Literature

Patent Literature 1: Japanese Patent Application Laid-open No. 2006-92017

SUMMARY

Technical Problem

There is a case in which the above-described work machine management system uses a mobile communication network in order to perform a communication between the work machine and the management device. In this case, the communication data amount may be limited according to the communication system of the mobile communication. For this reason, in a case where the mobile communication is used, there is a possibility that the information exchanged between the work machine and the management device may be missed.

An object of the invention is to reliably exchange information between the work machine and the management device.

Solution to Problem

According to the present invention, a work machine comprises: an information generation unit that generates work machine information as information on the work machine; a division unit that divides the work machine information by a predetermined data amount to generate divided work machine information; an information assignment unit that assigns attribute information indicating an attribute of the divided work machine information to the divided work machine information; and a communication unit that transmits, to an outside of the work machine, the work machine information or the divided work machine information to which the attribute information is assigned.

In the present invention, it is preferable that the attribute information includes at least information indicating the work machine information that is divided into the divided work machine information, information indicating an order of the divided work machine information, and a division number.

In the present invention, it is preferable that the communication unit transmits the work machine information by a first communication system, and when a communication is not established by the first communication system, the communication unit transmits the divided work machine information to which the attribute information is assigned by a second communication system of which an information transmission amount of one communication is smaller than that of the first communication system.

In the present invention, it is preferable that when all of the divided work machine information is not transmitted by the second communication system, the communication unit re-transmits the all of the divided work machine information in a next transmission by the second communication system.

In the present invention, it is preferable that the division unit treats the work machine information as the divided work machine information even when the work machine information does not need to be divided, and the information assignment unit assigns the attribute information to the divided work machine information.

In the present invention, it is preferable that the division unit generates the divided work machine information when a data amount of the work machine information is larger than the predetermined data amount.

According to the present invention, a work machine comprises: a communication unit that receives at least one assignment information piece including at least information assigned to the work machine and attribute information indicating an attribute of the information; and a restoration unit that generates the information assigned to the work machine by deleting the attribute information from the assignment information piece when there is a single assignment information piece and generates the information assigned to the work machine by combining a plurality of assignment information pieces based on the attribute information and deleting the attribute information when there are the plurality of assignment information pieces.

According to the present invention, a work machine management system comprises: the work machine; and a restoration unit that generates the work machine information from the divided work machine information transmitted from the communication unit.

According to the present invention, a work machine management system comprises: the work machine; and an information generation unit that generates the assignment information piece and transmits the assignment information piece to the communication unit.

According to the present invention, a work machine comprises: an information generation unit that generates work machine information as information on the work machine; a division unit that divides the work machine information by a predetermined data amount to generate divided work machine information; an information assignment unit that assigns attribute information indicating an attribute of the divided work machine information to the divided work machine information; and a communication unit that transmits, to an outside of the work machine, the work machine information or the divided work machine information to which the attribute information is assigned, wherein the attribute information includes at least information indicating the work machine information that is divided into the divided work machine information, information indicating an order of the divided work machine information, and a division number, and wherein the communication unit transmits the work machine information by a packet communication, and when a communication is not established by the packet communication, the communication unit transmits the divided work machine information to which the attribute information is assigned by a short message service.

According to the invention, it is possible to reliably exchange information between the work machine and the management device.

BRIEF DESCRIPTION OF DRAWINGS

FIG. 9 is a flowchart illustrating an example of a work machine information transmitting and receiving process executed by the management system.

DESCRIPTION OF EMBODIMENTS

A mode (embodiment) for carrying out the invention will be described in detail with reference to the drawings.

<Outline of Work Machine Management System 1>

Figure 1:
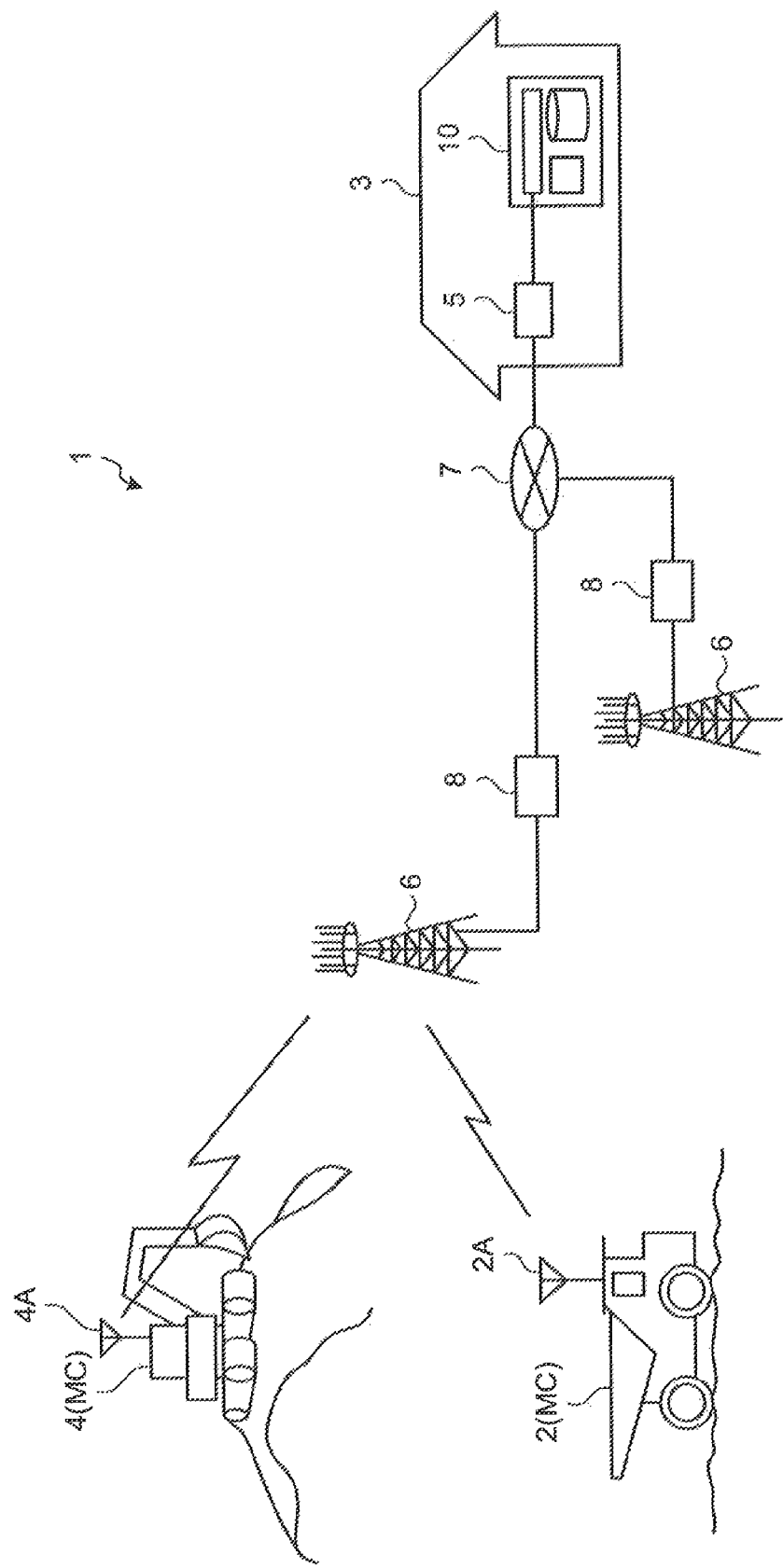
FIG. 1 is a diagram illustrating an application site of a work machine management system according to an embodiment.

FIG. 1 is a diagram illustrating an application site of a work machine management system 1 according to an embodiment. The work machine management system (hereinafter, appropriately referred to as the management system) 1 performs the preventive maintenance and the failure diagnosis of the work machine by collecting and managing the information indicating the state of the work machine (hereinafter, appropriately referred to as the work machine information). In the example illustrated in FIG. 1, the management system 1 manages the states of a dump truck 2 and an excavator 4, but in this embodiment, the work machine is not limited thereto. For example, the management system 1 may manage a wheel loader, a bulldozer, a crane, or a forklift. In the description below, the dump truck 2 and the excavator 4 are appropriately referred to as a work machine MC.

In this embodiment, the work machine MC is a manned machine that is operated by an operator, but the work machine MC is not limited thereto. For example, the work machine MC may be an unmanned machine of which the running state is controlled by a control system or the like installed in the work machine MC under the management of the management system 1 and the operation state thereof is managed by the management system 1 or which is remotely operated by an operator via a management device 10 of the management system 1.

In the management system 1, for example, the management device 10 collects the work machine information of the work machine MC from the work machine MC via a wireless communication system that is applied to a mobile communication of a cellular phone or the like. For example, the management device 10 is installed inside a management facility 3. The management facility 3 may be installed inside the operation site of the work machine MC or may be installed at a place distant from the operation site of the work machine MC. For example, the management facility may be installed in a place where a service man or a manager who conducts the preventive maintenance of the work machine MC stays. Further, the management device 10 may be installed in a predetermined place or may be moved to an arbitrary place like a portable terminal having a wireless communication function. In this embodiment, the management device 10 is connected to a communication line 7 via a communication device 5. An exchange 8 is connected to the communication line 7. The exchange 8 connects a base station 6 to the communication line 7. The exchange 8 serves to relay the communication between the management device 10 and the communication device installed in the work machine MC with respect to the communication line 7. The base station 6 receives various information items from the communication device installed in the work machine MC, demodulates the information items, and transmits the demodulation result to the exchange 8.

The work machine MC transmits the work machine information collected by the control device installed therein to the outside from antennas 2A and 4A. The management device 10 obtains various information items including the work machine information transmitted from the communication device of the work machine MC via the base station 6, the exchange 8, the communication line 7, and the communication device 5. The work machine information that is generated by the control device of the work machine MC and is obtained by the management device 10 includes information indicating the operation state of the work machine MC. For example, the work machine information is at least one of position information (a coordinate of a latitude, a longitude, or an altitude) as information indicating the position of the work machine MC, an operation time, a running distance, an engine water temperature, a presence of abnormality, a position of abnormality, a code indicating the type of abnormality, a battery voltage state, a fuel remaining amount, a fuel consumption rate, and a load capacity. The work machine information is not limited thereto, and may be various information items in response to the type of the work machine. For example, the work machine information may be information indicating the work machine operation state. This work machine operation state indicates the operation time and the operation place of the work machine, the smooth operation state of the work machine, or the abnormality state of the work machine. Further, the work machine information is not limited to the information indicating the past operation state of the work machine, but may be also information indicating the current operation state thereof. Such work machine information is used for, for example, the preventive maintenance and the failure diagnosis of the work machine MC.

The management device 10 may transmit the information assigned to the work machine MC. In this case, the management device 10 transmits the information assigned to the work machine MC to the communication line 7 via the communication device 5. The information is modulated by the exchange 8 and is transmitted from the base station 6 in the form of a radio wave. The radio wave including the information assigned to the work machine MC and transmitted from the base station 6 is received by the antennas 2A and 4A of the work machine MC. The communication device of the work machine MC performs a modulation and conversion process so that the radio wave received by the antennas 2A and 4A becomes the original information decoded by a control device 20 to be described later, and transmits the result to the control device 20 of the work machine MC. In this way, the work machine MC and the management device 10 may exchange the information by the wireless communication. Next, the management device 10 will be described in more detail.

<Management Device 10>

Figure 2:
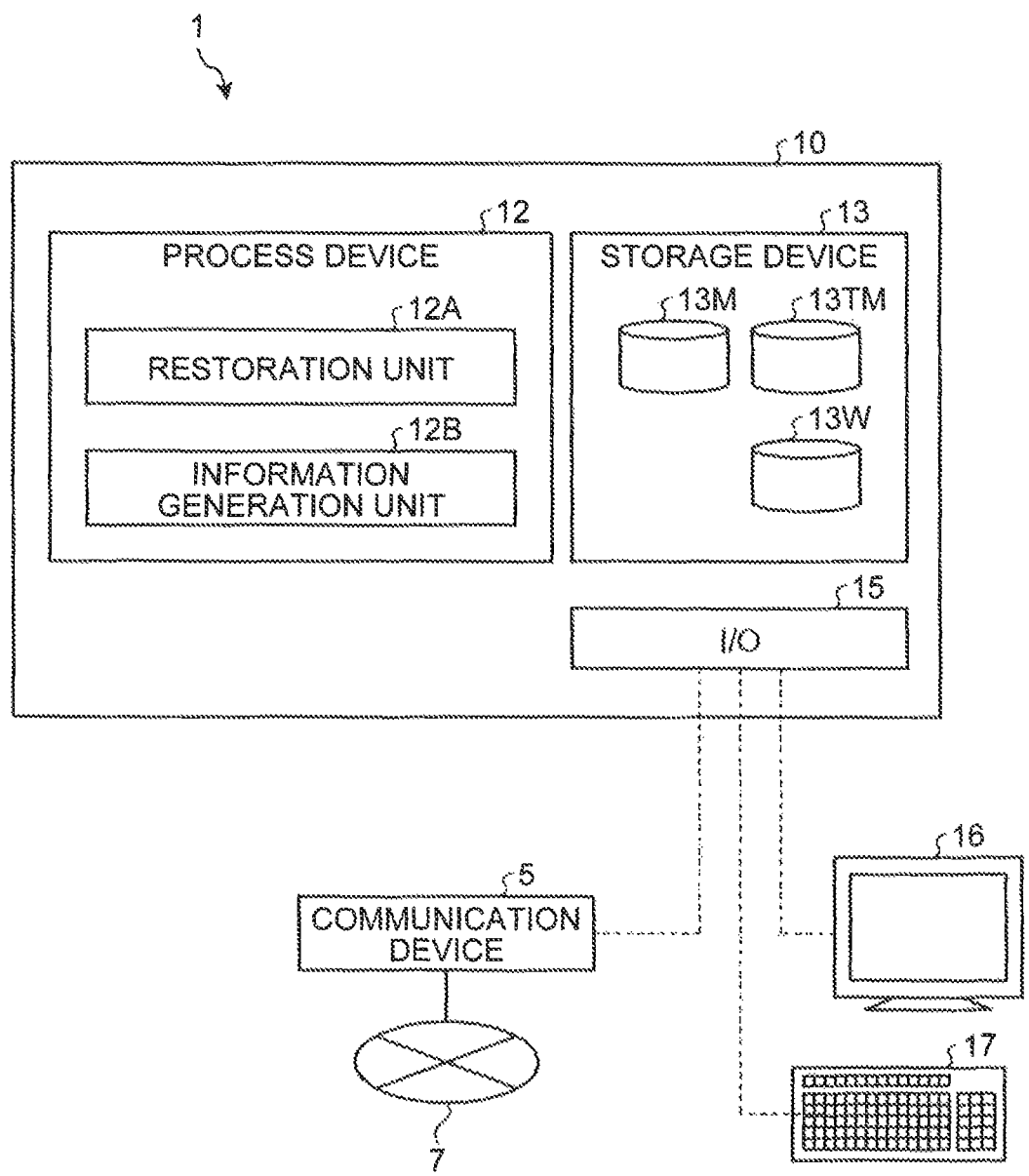
FIG. 2 is a functional block diagram of a management device included in the management system.

FIG. 2 is a functional block diagram of the management device 10 that belongs to the management system 1. The management device 10 includes a process device 12, a storage device 13, and an input and output unit (I/O) 15. In the management device 10, a display device 16, an input device 17, and a communication device 5 as output devices are connected to the input and output unit 15. The management device 10 is, for example, a computer. The process device 12 is, for example, a device that is configured by the combination of a CPU (Central Processing Unit) and a memory. The storage device 13 is configured as, for example, a RAM (Random Access Memory), a ROM (Read Only Memory), a flash memory, or a hard disk drive or is configured as the combination of these. The input and output unit 15 performs an information input and output process with respect to the process device 12 or the storage device 13. Further, the input and output unit 15 performs an information input and output process with respect to the display device 16 or the input device 17 connected to the management device 10 and further performs an information input and output process with respect to the communication device 5.

The process device 12 performs a work machine management method according to this embodiment. The process device 12 includes a restoration unit 12A and an information generation unit 12B. The restoration unit 12A generates the work machine information from the divided work machine information transmitted from the communication unit (the communication device) of the work machine MC illustrated in FIG. 1. The information generation unit 12B generates at least one assignment information including at least the information assigned to the work machine MC and the attribute information indicating the attribute of the information. The generated assignment information is transmitted to the communication unit of the work machine MC via the communication device 5. These functions are realized in a manner such that the process device 12 reads out a computer program corresponding to each function from the storage device 13 and executes the computer program.

The storage device 13 stores various computer programs for executing various processes by the process device 12 and the work machine information and the like obtained from the work machine MC. The storage device 13 includes a received data storage database 13M, a divided data temporary storage database 13TM, and a transmission data standby database 13W. The received data storage database 13M stores the work machine information that is generated from the divided work machine information transmitted from the work machine MC. The divided data temporary storage database 13TM temporarily stores the divided work machine information transmitted from the work machine MC. The transmission data standby database 13W stores the assignment information assigned to the work machine MC. The assignment information will be described in detail later.

The display device 16 is, for example, a liquid crystal display or the like. The input device 17 is, for example, a keyboard, a touch panel, or a mouse. Next, the work machine MC will be described in more detail.

<Work Machine MC>

Figure 3:
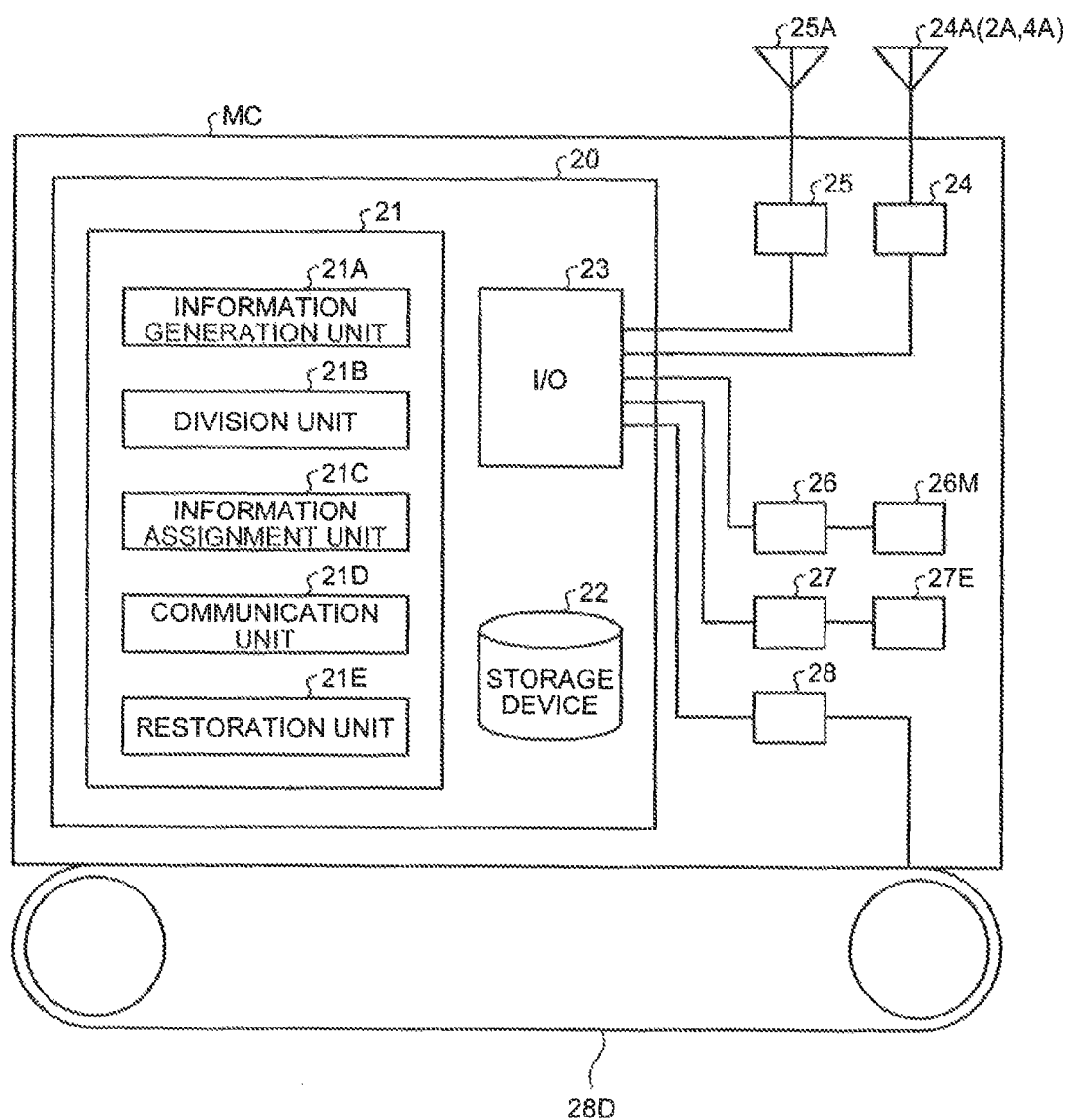
FIG. 3 is a block diagram illustrating an example of a work machine.

FIG. 3 is a block diagram illustrating an example of the work machine MC. The work machine MC includes the control device 20, a communication device 24 that is connected to an antenna 24A, a position detection device 25 that is connected to a GPS antenna 25A, a working unit controller 26 that controls a working unit 26M, an engine controller 27 that controls an engine 27E, and a running controller 28 that controls a running device 28D. In a case where the work machine MC is the excavator 4 illustrated in FIG. 1, the running controller 28 is not essentially needed. The work machine MC illustrated in FIG. 3 includes the working unit 26M. That is, the work machine MC is, for example, an excavator, a wheel loader, a bulldozer, a crane, or a forklift, but the machine provided with the working unit 26M is not limited. For example, the work machine MC may be a dump truck. Further, the work machine MC includes the engine 27E as a power generation source, but the power generation source may be an electric motor.

The control device 20 includes a process device 21, a storage device 22, and an input and output unit (I/O) 23. The control device 20 is, for example, a computer. The control device 20 controls the work machine MC and collects the work machine information. The control device transmits the collected work machine information to the outside of the work machine MC, that is, the management device 10 illustrated in FIGS. 1 and 2 via the communication device 24 and the antenna 24A. For example, the work machine information includes information indicating the state of the working unit 26M collected from the working unit controller 26, information indicating the state of the engine 27E collected from the engine controller 27, and information indicating the state of the running device 28D collected from the running controller 28 (information indicating a speed, an advancing direction, or the like).

The information indicating the state of the working unit 26M, the information indicating the state of the engine 27E, or the information indicating the state of the running device 28D includes the information that is obtained from various sensors such as a pressure sensor, a rotation sensor, or a temperature sensor (not illustrated). The work machine MC may set the output of the engine 27E and the speed of the running device 28D by a setting device such as an operation button (not illustrated). The information indicating the setting state may be collected by the control device 20, and the collected information may be included in the work machine information. Further, the position (the latitude, the longitude, and the altitude) of the work machine MC detected by the position detection device 25 and the information indicating the occurrence of the abnormality of the work machine MC are also included in the work machine information. The information indicating the occurrence of the abnormality in the work machine MC is, for example, the error code, the abnormality type, or the abnormality occurrence time. The work machine information is not limited to the information indicating the occurrence of the abnormality in the work machine MC, and may include information such as an operation time indicating whether the work machine MC is normally operated.

The process device 21 is, for example, a device that is configured by the combination of a CPU and a memory. The process device 21 includes an information generation unit 21A, a division unit 21B, an information assignment unit 21C, a communication unit 21D, and a restoration unit 21E. The information generation unit 21A collects information items on the position and the state of the work machine MC from the working unit controller 26, the engine controller 27, the position detection device 25, the running controller 28, and various sensors of the work machine MC, and generates the work machine information.

The division unit 21B divides the work machine information generated by the information generation unit 21A every predetermined data amount so as to generate the divided work machine information. The information assignment unit 21C assigns the attribute information for each divided work machine information to each of a plurality of divided work machine information items generated by the division unit 21B. The attribute information is information that represents the attribute of each divided work machine information. The attribute information indicates, for example, information indicating whether the information is the divided work machine information, the information indicating the number of parts of dividing the work machine information corresponding to the divided work machine information, the information indicating the order of each divided work machine information in the entire work machine information to be divided, and the information identifying the divided work machine information combination target.

The communication unit 21D transmits the work machine information or the divided work machine information having the attribute information assigned thereto to the outside of the work machine MC. Although the communication system will be described in detail later, the communication unit 21D transmits the work machine information by the use of a first communication system. In a case where the communication may not be established by the first communication system, the communication unit 21D transmits the divided work machine information having the attribute information assigned thereto by the use of a second communication system of which the information transmission amount of one communication is smaller than that of the first communication system.

As the first communication system, for example, a packet communication is known. The packet communication is a communication system in which data is divided into small parts and is transmitted and received one by one in a computer communication. The divided data is called a packet. A transmission target address, position information indicating the location of the current data in the entire data, and an error correction code are assigned to the packet other than the data. When the packet communication is used, the halfway line is not occupied in the communication between two points, and hence the communication line may be efficiently used. Further, since the packet communication may flexibly select the communication line, there is an advantage that the other communication line may be used even when a communication error occurs in a part of the communication line. In the packet communication, the amount of the information transmitted of one communication, that is, the amount of the data transmitted of one communication is not limited in principle.

As the second communication system, for example, an SMS (Short Message Service) is known. The SMS is, for example, a service that may transmit and receive short text messages between the cellular phones. The SMS is a system that designates a telephone number of a communication partner and immediately exchanges several tens of text messages of two bytes (Japanese) or a hundred and several tens of text messages of one byte (English and Numeral) between the cellular phones which transmit and receive the SMS. The SMS that has an image or a voice attached thereto is called an MMS (Multimedia Messaging Service). Broadly, the SMS may be used regardless of the difference of the nation or the communication carrier (telecommunication corporation) since a standard that may exchange a message of up to 140 bytes (160 texts as a seven-bit alphabet) is distributed as a part of a GSM (registered trademark) standard. In the SMS, the transmission amount of one communication is limited to a predetermined size, for example, 140 bytes. For this reason, the data transmission amount of one communication in the SMS as the second communication system is smaller than that of the packet communication as the first communication system.

Generally, the SMS communication may be used in many cases even when the packet communication may not be used. For this reason, in this embodiment, as described above, the communication unit 21D of the control device 20 generally transmits the work machine information to the outside of the work machine MC by the use of, for example, the packet communication as the first communication system. Then, in a case where the communication may not be established by the first communication system, the communication unit 21D transmits the divided work machine information having the attribute information by the use of, for example, the SMS as the second communication system in which the information transmission amount of one communication is smaller than that of the first communication system. With such a configuration, the control device 20 and the work machine MC may transmit the work machine information to the management device 10 by the use of the SMS even at a distant place where the packet communication may not be used.

In a case where the communication unit 21D transmits the work machine information by the use of the second communication system, the transmission amount of one communication is limited to, for example, 140 bytes. For this reason, the communication unit 21D transmits the work machine information to the outside of the work machine MC by the use of the second communication system. The work machine information is divided by the division unit 21B so as to become the work machine information having the attribute information assigned thereto by the information assignment unit 21C, that is, the divided work machine information, and is transmitted to the outside of the work machine MC. The divided work machine information is transmitted by the second communication system. For this reason, the divided work machine information is set so that the size including the attribute information does not exceed the limitation of the transmission amount of one communication.

The division unit 218B divides the original work machine information. At this time, the size of the divided work machine information transmission amount is limited in one communication using the second communication system. The original work machine information is divided into a size equal to or smaller than the size obtained by subtracting the attribute information from the transmission amount. The information in which the attribute information is assigned to the divided work machine information generated in this way is set so that the information transmission amount of one communication is equal to or smaller than the limitation of the transmission amount of one communication using the second communication system. For this reason, even when the original work machine information exceeds the limitation of the transmission amount of one communication in the second communication system, the communication unit 21D may transmit the divided work machine information having the attribute information to the outside of the work machine MC by the use of the second communication system. In this embodiment, in a case where there are a plurality of divided work machine information items having the attribute information assigned thereto, the communication unit 21D transmits the divided work machine information items by the use of the second communication system.

There is a case in which the management device 10 illustrated in FIG. 2 assigns information, for example, an instruction for locking the operation of the work machine MC in order to improve the updated software and the security. In this case, the information generation unit 12B of the management device 10 generates information that may be assigned to the work machine MC. The information is stored in the transmission data standby database 13W until the information is transmitted to the work machine MC, and is transmitted from the management device 10 to the work machine MC via the communication device 5 at the transmission timing.

In a case where the management device 10 transmits the information to the work machine MC by the use of the second communication system, the transmission amount of one communication is limited as described above. For this reason, in a case where the second communication system is used, the information generation unit 12B divides the information assigned to the work machine MC, assigns the attribute information indicating the attribute of the divided information to each divided information, and transmits the information to the work machine MC. The attribute information indicates, for example, at least one of information indicating whether the information is the assignment information, information indicating whether the information is the divided information, information indicating the number of parts of dividing the information corresponding to the divided information, information indicating the order of each divided information in the entire information to be divided, and information identifying the divided information combination target. The information that includes at least the divided information and the attribute information of the information is referred to as the assignment information. In a case where the information is transmitted from the management device 10 to the work machine MC, the communication unit 21D may obtain at least one assignment information. The assignment information obtained by the communication unit 21D is stored in the storage device 22 of the control device 20.

In a case where there is a single assignment information stored in the storage device 22, that is, the assignment information is not divided in the management device 10 but is transmitted to the work machine MC, the restoration unit 21E generates information assigned to the work machine MC by deleting the attribute information from the assignment information. In a case where there are a plurality of assignment information, the restoration unit 21E generates (restores) information assigned to the work machine MC by combining the plurality of assignment information based on the attribute information and deleting the attribute information. With such a configuration, even when the information is transmitted from the management device 10 to the work machine MC by the use of the second communication system, the control device 20 may receive and restore the information.

The storage device 22 is configured as, for example, a RAM (Random Access Memory), a ROM (Read Only Memory), a flash memory, or a hard disk drive or is configured as the combination of these. The storage device 22 temporarily stores the work machine information, the divided work machine information, and the divided work machine information having the attribute information assigned thereto generated by the process device 21 or stores the information assigned to the work machine MC or the assignment information transmitted from the management device 10 as described above.

The storage device 22 stores a computer program having an instruction of a process executed by the process device 21, a computer program having an instruction of a process for collecting the work machine information, a computer program having an instruction for controlling the work machine MC, and various setting values for operating the work machine management system 1. The process device 21 reads out the above-described computer program and executes the corresponding process.

The input and output unit 23 is connected with various devices such as the process device 21, the communication device 24 connected to the control device 20, the position detection device 25, the working unit controller 26, the engine controller 27, and the running controller 28 and various sensors. The input and output unit 23 performs an information input and output process among the process device 21, the devices, and the sensors connected thereto. The control device 20 and each controller may communicate with each other by the use of a CAN (Controller Area Network).

The communication device 24 is used when the control device 20 communicates with the outside of the work machine MC. In this embodiment, the communication device 24 is a wireless communication device. The communication device 24 includes various control devices, various sensors, a communication terminal, and a communication modem. The communication device 24 performs a wireless communication with respect to the base station 6 illustrated in FIG. 1 via the antenna 24A. The antenna 24A may be an antenna 2A of the dump truck 2 illustrated in FIG. 1, an antenna 4A of the excavator 4, or another antenna. The control device 20 transmits and receives the information items such as the work machine information, the divided work machine information, and the assignment information via the antenna 24A and the communication device 24.

The position detection device 25 includes the GPS antenna 25A. The GPS antenna 25A receives the radio waves output from a plurality of GPS satellites constituting a GPS (Global Positioning System). The GPS antenna 25A outputs the received radio waves to the position detection device 25. The position detection device 25 converts the radio waves received by the GPS antenna 25A into an electric signal and calculates (measures) the own position information, that is, the position of the position detection device 25, thereby obtaining the position information of the work machine MC equipped with the position detection device 25. The position information is information on the position of the work machine MC, and is the coordinate of the latitude, the longitude, or the altitude. In order that the position detection device 25 measures the own position, the measurement may be performed by another measurement satellite other than the GPS satellite. That is, the position measurement using a GNSS (Global Navigation Satellite System) may be performed.

<Work Machine Information and the Like>

Figure 4:
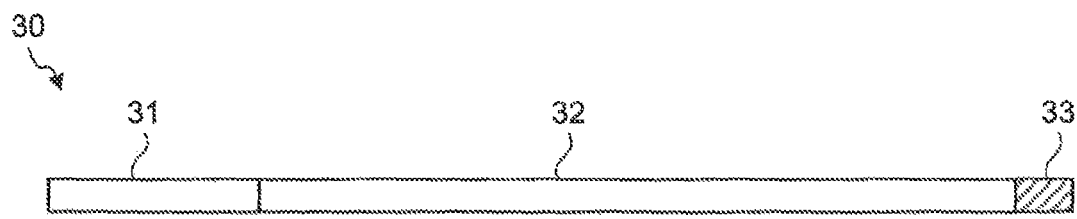
FIG. 4 is a conceptual diagram illustrating an example of work machine information.

FIG. 4 is a conceptual diagram illustrating an example of the work machine information 30. As illustrated in FIG. 4, the work machine information 30 includes a header part 31, a body part 32, and a check part 33. The work machine information is continuously generated by the information generation unit 21A illustrated in FIG. 3 in this sequence. The information generation unit 21A does not consider the size of the data when the work machine information 30 is generated. The header part 31 includes the attribute of the work machine information 30. For example, the attribute includes information on the identification number, the generation data and time, and the size of the body part 32. The identification number may be, for example, information used to individually identify the work machine MC, such as the information corresponding to the telephone number of the communication device 24, the manufacturing number of the communication device 24, or the manufacturing number of the work machine MC. As described above, the body part 32 is information indicating the state of the work machine MC. For example, the information includes the detection values of various sensors included in the work machine MC, the operation time of the work machine MC, the position information of the work machine MC, and some kinds of error codes.

The check part 33 is attached to the tail end of the work machine information 30. One work machine information item 30 does not include information after the check part 33. The check part 33 is data that is used to check whether there is any change in the content of the information of the header part 31 and the body part 32 after the information is transmitted from the work machine MC to the outside thereof and is received by the management device 10. This change indicates a phenomenon in which data is damaged or unexpectedly changed during the transmission of the work machine information 30. The check part 33 is assigned to the tail end of the work machine information 30 when the work machine information 30 is generated. For example, the information of the check part 33 may be obtained by counting the bit number of 0 and 1 with respect to the information constituting the header part 31 and the body part 32. For this reason, for example, in a case where the management device 10 illustrated in FIG. 2 obtains certain work machine information 30, a change check unit (not illustrated) of the process device 12 recognizes the existence of the check part 33 in the obtained work machine information 30 and compares the information of the check part 33 with the information of the header part 31 and the body part 32, thereby checking whether the work machine information 30 is changed. In a case where the work machine information 30 is not changed, it is understood that the entire work machine information is received. Further, in a case where certain assignment information is transmitted from the management device 10, when the check part 33 included in the assignment information is transmitted to the work machine MC, the change check unit (not illustrated) of the control device 20 of the work machine MC may check whether the assignment information is changed according to the above-described sequence.

<Divided Work Machine Information>

Figure 5:
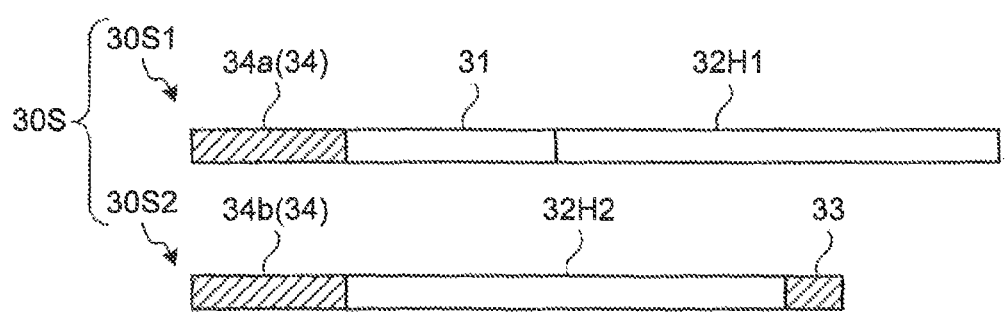
FIG. 5 is a conceptual diagram illustrating an example of divided work machine information.

FIG. 5 is a conceptual diagram illustrating an example of divided work machine information 30S. The divided work machine information 30S illustrated in FIG. 5 is obtained by dividing the work machine information 30 illustrated in FIG. 4 into two information items. The division number changes in accordance with the original work machine information 30, that is, the size of the work machine information 30 as the division target. In the description below, when each divided work machine information 30S is identified, the numeral 1 and 2 are attached to the reference numeral 30S of the divided work machine information. The divided work machine information 30S1 includes attribute information 34a, the header part 31 of the original work machine information 30, and a part (hereinafter, appropriately referred to as a segment) 32H1 of the body part 32 of the original work machine information 30. The divided work machine information 30S2 includes attribute information 34b and a part (hereinafter, appropriately referred to as a segment) 32H2 of the body part 32 of the original work machine information 30. In the description below, when the attribute information items 34a and 34b are not distinguished from each other, the attribute information is appropriately used as the attribute information 34.

The divided work machine information 30S is transmitted to the outside of the work machine MC by the use of the SMS. For this reason, the division unit 21B illustrated in FIG. 3 divides the work machine information 30 so that the size of each divided work machine information 30S does not exceed the limitation of the transmission amount of one communication in the SMS. In a case where the division unit 21B divides the work machine information 30, the work machine information 30 is simply divided by a predetermined size (data amount) regardless of the meaning of the work machine information 30. When the work machine information 30 is divided in consideration of the meaning of the work machine information 30, a process of analyzing the meaning needs to be performed, and hence a complex division process needs to be performed. However, it is desirable to simply divide the work machine information 30 by the unit of the data amount in order to immediately perform the division process. In a case where the division unit 21B divides the work machine information 30, each of the divided work machine information items 30S1 and 30S2 does not have an individual check part attached thereto. For this reason, the divided work machine information 30S1 does not have the check part 33 at the tail end thereof, and the check part 33 attached to the tail end of the work machine information 30 to be divided is left at the tail end of the divided work machine information 30S2.

The predetermined data amount that may be actually transmitted for one communication in the SMS is determined based on the limitation of the transmission amount of one communication in the SMS. The limitation of the transmission amount of one communication in the SMS is denoted by DS, and the size of the attribute information 34 included in the divided work machine information 30S is denoted by DB. Accordingly, the predetermined data amount (DS−DB) is obtained by subtracting DB from DS. When the size (data amount) of the work machine information 30 to be divided is denoted by DM and the predetermined data amount is denoted by DU (=DS−DB), the division number N may be obtained by the following (1) and (2) based on the result in which DM is divided by DU and the quotient is obtained to one digit. In a case where the remainder does not exist in the calculation result obtained by dividing DM by DU, the division number N becomes the value obtained by dividing DM by DU. In a case where the remainder exists, the division number N is obtained in a manner such that 1 is added to the value obtained by dividing DM by DU.

(1) division number N=DM/DU in case of DM/DU>1 and non-existence of remainder (2) division number N=DM/DU+1 in case of DM/DU>1 and existence of remainder In this embodiment, in a case where the work machine information 30 is transmitted by the use of the SMS, even when the work machine information 30 does not need to be divided due to its small size DM, the control device 20 treats the work machine information 30 as the divided work machine information 30S. With such a configuration, since there is no need to perform a determination on whether to divide the work machine information 30 in response to the size DM thereof, the process may be simplified. The state in which the work machine information 30 is treated as the divided work machine information 30S indicates that the control device 20, that is, the information assignment unit 21C assigns the attribute information 34 to the work machine information 30. With such a configuration, the work machine information 30 is treated as the divided work machine information 30S in the following process.

For example, the division unit 21B may determine the necessity of the division based on whether the size DM of the work machine information 30 is equal to or smaller than the predetermined data amount DU. The control device treat the work machine information 30 as the divided work machine information 30S when the size DM of the work machine information 30 is equal to or smaller than the predetermined data amount DU. When the size DM of the work machine information 30 is equal to or smaller than the predetermined data amount DU, the value obtained by dividing DM by DU is equal to or smaller than 1 (DM/DU≤1). In this case, the division number becomes 1 (the division number N=1). Furthermore, in this embodiment, in a case where the work machine information 30 is transmitted by the use of the SMS, the control device 20 transmits the work machine information 30 in a non-divided state when there is no need to divide the work machine information or transmits the work machine information 30 in a divided state when there is a need to divide the work machine information.

The determination that the work machine information 30 does not need to be divided due to the small size DM thereof may be performed based on, for example, the limitation DS of the transmission amount of one communication in the SMS. For example, the division unit 21B divides the work machine information 30 when the size DM of the work machine information 30 exceeds the limitation DS of the transmission amount of one communication in the SMS. In a case where the size DM of the work machine information 30 is equal to or smaller than the predetermined data amount DU, the value obtained by dividing DM by DU is equal to or smaller than 1 (DM/DU≤1). In this case, the division number becomes 1 (the division number N=1).

<Attribute Information>

Figure 6:
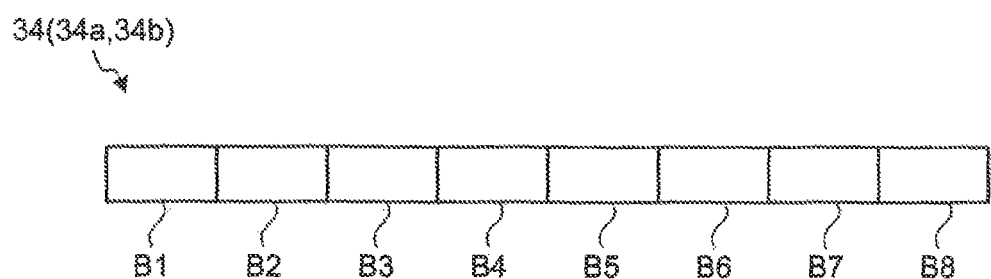
FIG. 6 is a conceptual diagram illustrating an example of attribute information.

FIG. 6 is a conceptual diagram illustrating an example of the attribute information 34. The attribute information 34 (34a, 34b) includes eight areas B1, B2, B3, B4, B5, B6, B7, and B8 for storing the information. The storage capacity of each of the areas B1, B2, B3, B4, B5, B6, B7, and B8 is, for example, one byte. That is, in this embodiment, the attribute information 34 includes a storage capacity of eight bytes. The area B1 stores a division identifier. The areas B2 and B3 store an order number. The areas B4 and B5 store a block number. The areas B6 and B7 store the number of total blocks. The area B8 is a spare area. The area B8 may store the associated information in accordance with the necessity.

The division identifier is information that is used to identify whether the information having the attribute information 34 storing the division identifier is the divided work machine information 30S. The order number is information that is used to identify the combination target of the divided work machine information 30S. As the order number, for example, the identifier attached to the original work machine information 30, that is, the work machine information 30 to be divided may be used. In this embodiment, the divided work machine information items 30S having the same order number are divided from the same work machine information 30. Accordingly, the divided work machine information items 30S having the same order number are combined so as to be restored to the original work machine information 30. The block number is information indicating the location of the divided work machine information 30S in the work machine information 30 to be divided. The number of total blocks is information indicating the number of parts of dividing the work machine information 30 corresponding to the divided work machine information 30S. The number of total blocks corresponds to the division number N.

Based on these information items included in the attribute information 34, the restoration unit 12A of the management device 10 illustrated in FIG. 2 restores the obtained divided work machine information 30S to the original work machine information 30. In this way, the attribute information 34 includes at least the order number as the information indicating the work machine information to be divided as the divided work machine information 30S, the block number as the information indicating the order of the divided work machine information 30S, and the number of total blocks corresponding to the division number N. By these information items, the restoration unit 12A may reliably generate the original work machine information from the divided work machine information 30S. That is, even when a plurality of divided work machine information items 30S having different original work machine information items 30 are transmitted from the same work machine MC to the management device 10 or a plurality of divided work machine information items 30S are transmitted from different work machines MC, the restoration unit 12A may restore the divided work machine information items 30S to the respective original work machine information items 30 based on the attribute information 34.

Figure 7:
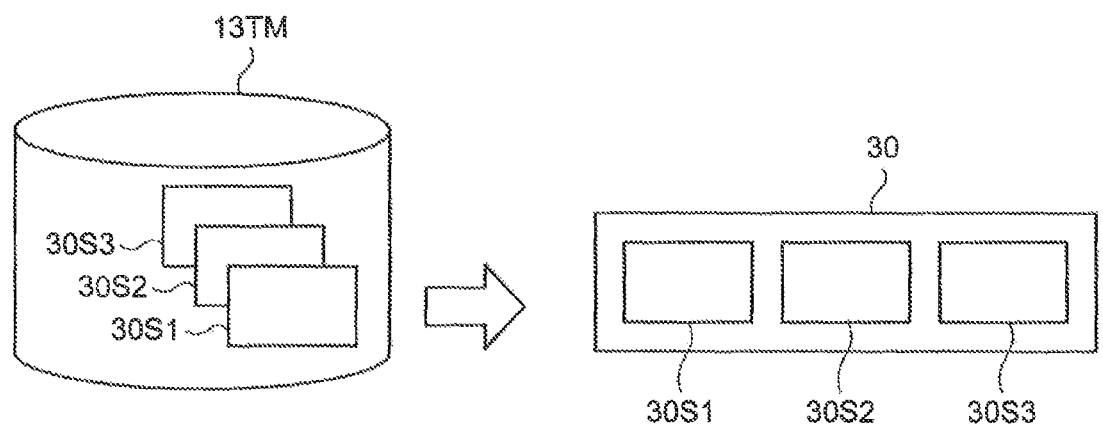
FIG. 7 is a diagram illustrating an example of a process in which the management device restores the divided work machine information to the original work machine information.
Figure 8:
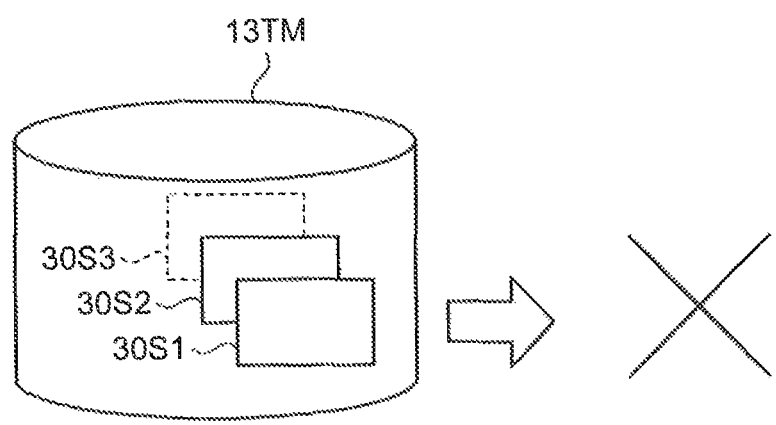
FIG. 8 is a diagram illustrating an example of a process in which the management device restores the divided work machine information to the original work machine information.

FIGS. 7 and 8 are diagrams illustrating an example of a process in which the management device 10 restores the divided work machine information 30S to the original work machine information 30. The divided work machine information 30S transmitted from the work machine MC is stored in the divided data temporary storage database 13TM of the storage device 13 included in the management device 10 illustrated in FIG. 2. As illustrated in FIG. 7, it is assumed that the work machine information 30 illustrated in FIG. 4 is divided into three divided work machine information items 30S1, 30S2, and 30S3 by the division unit 21B of the work machine MC and the divided work machine information items 30S1, 30S2, and 30S3 are transmitted to the management device 10 so as to be stored in the divided data temporary storage database 13TM. In a case where the divided data temporary storage database 13TM stores all the divided work machine information items 30S1, 30S2, and 30S3, the restoration unit 12A of the management device 10 restores (generates) the original work machine information 30 from the divided work machine information items 30S1, 30S2, and 30S3.

As illustrated in FIG. 8, in a case where the divided data temporary storage database 13TM stores two of the three divided work machine information items 30S1, 30S2, and 30S3 but does not store one of them (in this example, the divided work machine information 30S3), the restoration unit 12A of the process device 12 does not restore (generate) the work machine information 30. That is, the restoration unit 12A does not restore the work machine information 30 when all the divided work machine information items 30S1, 30S2, and 30S3 divided from the original work machine information 30 are not prepared. With such a configuration, the management system 1 may prevent the information of the work machine information 30 from being missed after the restoration. Next, an example of a process of transmitting and receiving the work machine information 30 executed in the management system 1 will be described.

<Example of Transmitting and Receiving Process>

FIG. 9 is a flowchart illustrating an example of a work machine information transmitting and receiving process executed by the management system 1. As described above, the control device 20 of the work machine MC illustrated in FIG. 3 collects the information on the state of the work machine MC from various sensors of the work machine MC and stores the information as the work machine information 30 in the storage device 22. In step S101, the control device determines whether to transmit the work machine information 30 to the outside of the work machine MC. For example, it is set so that the work machine information 30 is transmitted from the work machine MC at a predetermined time every day. The control device 20 reads out the time from the clock embedded therein and compares the time with the above-described predetermined time. When the read time is the above-described predetermined time, the control device 20 determines that the work machine information 30 is transmitted (Yes in step S101). When the read time is not the above-described predetermined time, the control device 20 determines that the work machine information 30 is not transmitted (No in step S101).

In a case where the work machine information 30 is transmitted (Yes in step S101), the information generation unit 21A of the control device 20 generates the work machine information 30 from the information on the state of the work machine MC stored in the storage device 22, and the routine proceeds to step S102. In a case where the work machine information 30 is not transmitted (No in step S101), the control device 20 waits for the timing at which the work machine information 30 is transmitted.

In step S102, the communication unit 21D of the control device 20 first transmits the work machine information 30 by the use of the packet communication. For example, in a state where the radio wave reaches, the communication unit 21D transmits a request of the packet communication to the base station 6 illustrated in FIG. 1 via the communication device 24. In a case where there is a response that represents the establishment of the packet communication from the base station 6, the packet communication is established. In this case, the communication unit 21D transmits the work machine information 30 by the use of the packet communication. In a case where there is no response that represents the establishment of the packet communication from the base station 6, the packet communication is not established. In this case, the communication unit 21D may not transmit the work machine information 30 by the use of the packet communication.

In a case where the work machine information 30 may be transmitted by the use of the packet communication (Yes in step S103), the process of transmitting the work machine information 30 ends. In a case where the work machine information 30 may not be transmitted by the use of the packet communication (No in step S103), in step S104, the communication unit 21D selects the transmission of the work machine information 30 using the SMS. In this embodiment, as illustrated in FIG. 9, a process is illustrated in which the transmission of the work machine information 30 is attempted by the packet communication and then the work machine information 30 is transmitted by the SMS to be described later, but the invention is not limited thereto. For example, the work machine MC or the work machine management system 1 may be used which performs a communication process by the SMS without attempting the packet communication.

Next, in step S105, the communication unit 21D determines whether the communication may be performed by the SMS. The determination that the communication may not be performed by the SMS is performed, for example, as below. The communication unit 21D detects the strength of a predetermined radio wave generally oscillated from the base station 6 and determines that the communication may not be performed by the SMS when the strength of the radio wave is smaller than a predetermined threshold value (No in step S105). The determination on whether the communication may be performed by the SMS (step S105) may be performed after step S108 to be described later. However, in this case, when it is determined that the communication may not be performed by the SMS, the division process that is performed before is useless. Accordingly, it is desirable to perform the determination on whether the communication may be performed by the SMS (step S105) before the division process (step S106).

In a case where the communication may be performed by the SMS (Yes in step S105), the control device performs the process of step S106. In a case where the communication may not be performed by the SMS (No in step S105), the control device 20 does not transmit the work machine information 30 at the current process, and transmits the work machine information 30 or the divided work machine information 30S at the next timing at which the packet communication or the SMS may be established.

In step S106, the division unit 21B of the control device 20 determines whether to perform the division process. When it is determined that the division process is performed, the division process is performed as below. When the size DM of the work machine information 30 is larger than the predetermined data amount DU (Yes in step S106), in step S107, the division unit 21B divides the work machine information 30 into a plurality of parts at every predetermined data amount DU. Next, in step S108, the information assignment unit 21C of the control device generates the attribute information 34 corresponding to each work machine information 30 divided by the division unit 21B, and assigns the attribute information to the corresponding work machine information 30 so as to generate the divided work machine information 30S. In this case, a plurality of attribute information items 34 and a plurality of divided work machine information items 30S are generated in response to the division number N.

In the determination on whether to perform the division process, when the size DM of the work machine information 30 is equal to or smaller than the predetermined data amount DU (No in step S106), the division unit 20B does not divide the work machine information 30. Next, in step S108, the information assignment unit 21C of the control device 20 generates the attribute information 34 corresponding to the work machine information 30, and assigns the attribute information to the corresponding work machine information 30 so as to generate the divided work machine information 30S. In this case, since the division number N is 1, a single attribute information item 34 and a single divided work machine information item 30S are generated.

Furthermore, in a case where the size DM of the work machine information 30 is equal to or smaller than the predetermined data amount DU, the control device 20 may directly transmit the work machine information 30 to the management device 10 without generating the divided work machine information 30S.

When the division process, that is, the process of step S106 is performed on the work machine information 30, the information assignment unit 21C may generate the division identifier and may generate the order number from the identifier attached to the work machine information 30. The number of total blocks is generated based on the division number N. The block number may be set as the order of generating the divided work machine information 30S. For this reason, the information assignment unit 21C may generate the attribute information 34 based on the attribute of the work machine information 30 and the content of the division process at the timing in which the division process is performed on the work machine information 30.

When the divided work machine information 30S is generated, in step S109, the communication unit 21D of the control device 20 transmits the generated divided work machine information 30S by the use of the SMS. In a case where the divided work machine information 30S is transmitted by the use of the SMS, one divided work machine information item 30S of one communication is transmitted by the use of the SMS. In a case where the divided work machine information 30S is successfully transmitted from the work machine MC by the use of the SMS, the communication carrier that provides the SMS transmits information (hereinafter, appropriately referred to as transmission completion information) that informs the successful transmission to the communication device 24 of the control device 20. That is, whenever one divided work machine information item 30S is transmitted from the work machine MC to the management device 10 via the communication carrier by one communication using the SMS, the exchange of the communication carrier transmits the transmission completion information to the work machine MC. The control device 20 that obtains the transmission completion information via the communication device 24 does not transmit again the divided work machine information 30S that is completely transmitted.

In a case where the control device 20 does not obtain the transmission completion information within a predetermined period, there is a case in which the work machine information 30 is transmitted by the packet communication since a certain time elapses from the timing at which the divided work machine information 30S is transmitted by the SMS. For this reason, in a case where the control device 20 does not obtain the transmission completion information within a predetermined period, the process is sequentially performed from step S101 in order to attempt the packet communication. As a result, in a case where the work machine information 30 is transmitted again by the use of the SMS, the communication unit 21D of the control device 20 transmits all divided work machine information items 30S divided from the work machine information 30. That is, in a case where the communication unit 21D may not transmit all divided work machine information items 30S by the SMS as the second communication system, all divided work machine information items 30S are transmitted again at the next transmission by the SMS. With such a configuration, it is possible to prevent the divided work machine information 30S received by the management device 10 from being missed. Next, the process of the management device 10 that receives the divided work machine information 30S will be described.

The management device 10 may obtain the work machine information 30 transmitted from the work machine MC by the SMS by reading out the divided work machine information 30S or the work machine information 30 in the mail box of the communication carrier that provides the SMS. Meanwhile, the management device 10 may obtain the work machine information 30 from the work machine MC by the packet communication. That is, the management device 10 may obtain the work machine information 30 by a different interface.

In step S110, the management device 10 receives the divided work machine information 30S transmitted from the work machine MC. The received divided work machine information 30 is temporarily stored in the divided data temporary storage database 13TM of the storage device 13.

The management device 10 determines whether the information is the divided work machine information 30S by the division identifier included in the attribute information 34 of the received divided work machine information 30S, and stores the received divided work machine information 30S in the divided data temporary storage database 13TM.

Next, in step S111, the restoration unit 12A of the management device 10 periodically reads out the divided work machine information 30S from the divided data temporary storage database 13TM, and determines whether all divided work machine information items 30S having the same order number are received. The determination is performed by the restoration unit 12A using the number of total divided blocks, the block number, and the order number included in the attribute information 34. When all divided work machine information items 30S having the same order number are received (Yes in step S111), in step S112, the restoration unit 12A combines all divided work machine information items 30S so as to restore (generate) the original work machine information 30. That is, the restoration unit 12A checks whether the divided work machine information items 30S having the same order number are provided as many as the number of total divided blocks, recognizes the order of restoring the information to the original work machine information 30 based on the information of the block number of each divided work machine information 30S, and restores (generates) the original work machine information 30. When the process of step S112 is performed, a series of processes end.

In a case where there are a plurality of divided work machine information items 30S as the restoration targets, the restoration unit 12A restores (generates) the original work machine information 30 by deleting the attribute information 34 from each divided work machine information item 30S and combining the plurality of divided work machine information items 30S from which the attribute information 34 is deleted according to the order of the block number. In a case where there is a single divided work machine information item 30S, the restoration unit 12A restores (generates) the original work machine information 30 by deleting the attribute information 34 from the divided work machine information 30S. The restored work machine information 30 is stored in the received data storage database 13M, and is used for various kinds of analysis involving with the operation management, the preventive maintenance, or the failure diagnosis of the work machine MC. The management device 10 may perform a necessary process such as data analysis before the restored work machine information 30 is stored in the received data storage database 13M.

In a case where at least one of all divided work machine information items 30 having the same order number is not received (No in step S111), in step S113, the management device 10 determines whether the divided work machine information 30S of which the validated period is expired exists in the divided data temporary storage database 13TM. The validated period is not limited, but may be set to, for example, about one day to one week. In a case where there is the divided work machine information 30S of which the validated period is expired (Yes in step S113), in step S114, the management device 10 deletes the divided work machine information 30S from the divided data temporary storage database 13TM and returns the routine to step S110 so as to perform a process after that step. In a case where there is not the divided work machine information 30S of which the validated period is expired (No in step S113), the management device 10 returns the routine to step S110 so as to perform a process after that step. The process of step S113 does not need to be essentially performed. However, it is desirable to perform the processes of step S113 and step S114 in order to prevent a problem in which the storage capacity is occupied by the divided work machine information 30S of which the validated period is expired and which is stored in the divided data temporary storage database 13TM.

In a case where the work machine MC transmits the work machine information 30 to the management device 10 by the use of the SMS according to such a process, the work machine information 30 may be transmitted from the work machine MC to the management device 10 even when there is a need to transmit the work machine information 30 exceeding the information transmission amount of one communication by the SMS. For this reason, the management device 10 and the work machine MC may reliably exchange the information therebetween. Further, even in the work machine MC that is operated in a region where the packet communication may not be established and only the SMS may be used, the work machine information 30 may be transmitted to the management device 10. Since the region where the SMS may be used comparatively wide, the management device 10 may easily collect the work machine information 30 from many work machines MC. Since the work machine MC is operated in a mountain area or a remote area or is operated in a nation or a region without infrastructure equipment in many cases, it is difficult to mention that the work machine is frequently used in a nation or a region where the packet communication may be performed. For this reason, the work machine information 30 may be easily collected by the use of the SMS.

The above-described process corresponds to the case where the work machine MC transmits the work machine information 30 to the management device 10, but the information may be reliably transmitted and received even in a case where the management device 10 transmits the information to the work machine MC. As described above, there is a case in which the management device 10 illustrated in FIG. 2 may transmit the information to the work machine MC. In this case, the information assigned to the work machine MC is first transmitted from the management device 10 by the first communication system (in this embodiment, the packet communication). In a case where the information assigned to the work machine MC is not transmitted by the packet communication, the management device 10 transmits the information assigned to the work machine MC by the use of the second communication system (in this embodiment, the SMS). In this case, the information generation unit 12B provided in the process device 12 of the management device 10 divides the information assigned to the work machine MC, and assigns the attribute information to the divided information so as to generate the assignment information.

The assignment information corresponds to the divided work machine information 30S that is generated by the information assignment unit 21C and the division unit 21B of the work machine MC. That is, the information generation unit 12B of the management device 10 generates the assignment information by the same process as that of the divided work machine information 30S. In a case where the SMS is used, the information assigned to the work machine MC is treated as the assignment information even when the information does not need to be divided. The attribute information included in the assignment information is information indicating the attribute of the assignment information. The attribute information indicates, for example, information indicating whether the information is the assignment information, information indicating the number of parts of dividing the information assigned to the work machine MC as the assignment information in order to transmit the information by the use of the SMS, information indicating the order of the entire information to be divided assigned to the work machine MC, and information used to identify the combination target of the assignment information.

The communication unit 21D of the work machine MC obtains at least one assignment information from the management device 10 via the communication device 24. The obtained assignment information is stored in the storage device 22 of the work machine MC. The obtained assignment information is restored to the original information by the restoration unit 21E of the control device 20 of the work machine MC. In this case, the restoration unit 21E reads out the assignment information from the storage device 22. In a case where there is a single assignment information, the restoration unit 21E generates the information assigned to the work machine MC by deleting the attribute information from the assignment information. In a case where there are a plurality of assignment information, the restoration unit restores (generates) the information assigned to the work machine MC by combining the plurality of assignment information based on the attribute information and deleting the attribute information therefrom. The restored information assigned to the work machine MC is stored in the storage device 22 of the work machine MC.

In a case where at least one of all assignment information having the same order number included in the attribute information is not received, the control device 20 of the work machine MC determines whether the assignment information of which the validated period is expired exists in the storage device 22. In a case where there is the assignment information of which the validated period is expired, the control device 20 deletes the assignment information from the storage device 22 and continuously receives the assignment information and the like. In a case where there is no assignment information of which the validated period is expired, the control device 20 continuously receives the assignment information and the like.

By such a process, in a case where the management device 10 transmits the assignment information to the work machine MC by the use of the SMS, the assignment information may be transmitted from the management device 10 to the work machine MC even in the case of the assignment information that exceeds the limitation of the information transmission amount of one communication by the SMS. For this reason, the management device 10 and the work machine MC may reliably exchange the information therebetween. Further, even in the work machine MC that is operated in a region where the packet communication may not be established and only the SMS may be used, the management device 10 may transmit the assignment information to the work machine MC. Since the region where the SMS may be used is comparatively wide, the management device 10 may easily transmit the assignment information to many work machines MC.

The above-described constituents include the constituents that may be easily supposed by the person skilled in the art, the constituents that substantially have the same configuration, and the constituents that are included in a so-called equivalent range. The above-described constituents may be used by the appropriate combination thereof. Further, various omissions, replacements, or modifications of the constituents may be performed without departing from the spirit of the embodiment.

REFERENCE SIGNS LIST

1 MANAGEMENT SYSTEM
2 DUMP TRUCK
3 MANAGEMENT FACILITY
4 EXCAVATOR
5 COMMUNICATION DEVICE
6 BASE STATION
7 COMMUNICATION LINE
8 EXCHANGE
10 MANAGEMENT DEVICE
12 PROCESS DEVICE
12A RESTORATION UNIT
12B INFORMATION GENERATION UNIT
13 STORAGE DEVICE
15 INPUT AND OUTPUT UNIT
16 DISPLAY DEVICE
17 INPUT DEVICE
20 CONTROL DEVICE
21 PROCESS DEVICE
21A INFORMATION GENERATION UNIT
21B DIVISION UNIT
21C INFORMATION ASSIGNMENT UNIT
21D COMMUNICATION UNIT
21E RESTORATION UNIT
22 STORAGE DEVICE
23 INPUT AND OUTPUT UNIT
24 COMMUNICATION DEVICE
25 POSITION DETECTION DEVICE
26 WORKING UNIT CONTROLLER
27 ENGINE CONTROLLER
28 RUNNING CONTROLLER
30 WORK MACHINE INFORMATION
30S, 30S1, 30S2 DIVIDED WORK MACHINE INFORMATION
31 HEADER PART
32 BODY PART
33 CHECK PART
34, 34a, 34b ATTRIBUTE INFORMATION

The invention claimed is:

1. A work machine comprising:
an information generation unit that generates work machine information as information on the work machine;
a division unit that divides the work machine information by a predetermined data amount to generate divided work machine information;
an information assignment unit that assigns attribute information indicating an attribute of the divided work machine information to the divided work machine information;
a storage device that stores the divided work machine information divided by the division unit; and
a communication unit that obtains the work machine information or the stored divided work machine information and transmits, to an outside of the work machine, the work machine information or the divided work machine information to which the attribute information is assigned,
wherein the attribute information includes a manufacturing number of the communication unit or a manufacturing number of the work machine, and a division identifier that is used to identify whether the attribute information is divided.

2. The work machine according to claim 1,
wherein the attribute information includes at least information indicating the work machine information that is divided into the divided work machine information, information indicating an order of the divided work machine information, and a division number.

3. The work machine according to claim 1,
wherein the communication unit transmits the work machine information by a first communication system, and when a communication is not established by the first communication system, the communication unit transmits the divided work machine information to which the attribute information is assigned by a second communication system of which an information transmission amount of one communication is smaller than that of the first communication system.

4. The work machine according to claim 3,
wherein when all of the divided work machine information is not transmitted by the second communication system, the communication unit re-transmits the all of the divided work machine information in a next transmission by the second communication system.

5. The work machine according to claim 1,
wherein the division unit treats the work machine information as the divided work machine information even when the work machine information does not need to be divided, and
wherein the information assignment unit assigns the attribute information to the divided work machine information.

6. The work machine according to claim 1,
wherein the division unit generates the divided work machine information when a data amount of the work machine information is larger than the predetermined data amount.

7. A work machine comprising:
a communication unit that receives at least one assignment information piece including at least information assigned to the work machine and attribute information indicating an attribute of the information;
a storage device that stores the at least one assignment information piece received by the communication unit; and
a restoration unit that obtains the at least one assignment information piece from the storage device, generates the information assigned to the work machine by deleting the attribute information from the assignment information piece when there is a single assignment information piece, and generates the information assigned to the work machine by combining a plurality of assignment information pieces based on the attribute information and deleting the attribute information when there are the plurality of assignment information pieces,
wherein the attribute information includes a manufacturing number of the communication unit or a manufacturing number of the work machine, and a division identifier that is used to identify whether the attribute information is divided.

8. A work machine management system comprising:
the work machine according to claim 1; and
a restoration unit that generates the work machine information from the divided work machine information transmitted from the communication unit.

9. A work machine management system comprising:
the work machine according to claim 7; and
an information generation unit that generates the assignment information piece and transmits the assignment information piece to the communication unit.

10. A work machine comprising:
an information generation unit that generates work machine information as information on the work machine;
a division unit that divides the work machine information by a predetermined data amount to generate divided work machine information;
an information assignment unit that assigns attribute information indicating an attribute of the divided work machine information to the divided work machine information;
a storage device that stores the divided work machine information divided by the division unit; and
a communication unit that obtains the work machine information or the stored divided work machine information, and transmits, to an outside of the work machine, the work machine information or the divided work machine information to which the attribute information is assigned,
wherein the attribute information includes at least information indicating the work machine information that is divided into the divided work machine information, information indicating an order of the divided work machine information, a division number, a manufacturing number of the communication unit or a manufacturing number of the work machine, and a division identifier that is used to identify whether the attribute information is divided, and
wherein the communication unit transmits the work machine information by a packet communication, and when a communication is not established by the packet communication, the communication unit transmits the divided work machine information to which the attribute information is assigned by a short message service.

11. The work machine according to claim 1, wherein the communication unit transmits the divided work machine information to which the attribute information is assigned by a short message service.

12. The work machine according to claim 1, wherein the communication unit uses a short message service to transmit the divided work machine information to which the attribute information is assigned.

13. The work machine according to claim 7, wherein the restoration unit generates the information assigned to the work machine by combining a plurality of assignment information pieces when the assignment information pieces are transmitted using a short message service.

14. The work machine according to claim 7, wherein the at least one assignment information piece is generated by and transmitted from another work machine.

15. The work machine according to claim 7, further comprising a storage device for storing the at least one assignment information piece after receipt by the communication unit, the restoration unit generating the information assigned to the work machine using the at least one assignment information stored in the storage device.

* * * * *